United States Patent [19]
Uenohara

[11] Patent Number: 5,351,796
[45] Date of Patent: Oct. 4, 1994

[54] CLUTCH COVER ASSEMBLY

[75] Inventor: Norihisa Uenohara, Neyagawa, Japan

[73] Assignee: Kabushiki Kaisha Daikin Seisakusho, Osaka, Japan

[21] Appl. No.: 971,960

[22] Filed: Nov. 5, 1992

[30] Foreign Application Priority Data

Nov. 8, 1991 [JP] Japan .................. 3-091681[U]

[51] Int. Cl.$^5$ .................. F16D 13/44; F16D 13/58
[52] U.S. Cl. .................. 192/70.27; 192/109 A; 192/89.23; 192/89.24
[58] Field of Search ......... 192/109 A, 89 PH, 89 PL, 192/70.27, 52

[56] References Cited

U.S. PATENT DOCUMENTS

| | | | |
|---|---|---|---|
| 3,323,624 | 6/1967 | Maurice | 192/109 A X |
| 4,095,683 | 6/1978 | Ban | 192/109 A X |
| 4,291,792 | 9/1981 | Henao | 192/109 A X |
| 4,641,736 | 2/1987 | Föster | 192/89 B |
| 4,696,384 | 9/1987 | Huber | 192/109 A X |
| 4,727,971 | 3/1988 | Janda et al. | 192/70.27 |
| 4,744,448 | 5/1988 | Maycock et al. | 192/70.27 |
| 4,770,282 | 9/1988 | Maycock et al. | 192/109 A X |
| 4,828,083 | 5/1989 | Naudin | 192/109 A X |
| 4,844,226 | 7/1989 | Taketani | 192/111 A |
| 5,022,508 | 6/1991 | Fukuda | 192/70.27 |
| 5,088,583 | 2/1992 | Takeuchi et al. | 192/70.27 |

FOREIGN PATENT DOCUMENTS

| | | | |
|---|---|---|---|
| 0249469 | 12/1987 | European Pat. Off. | 192/89 B |
| 0031721 | 2/1986 | Japan | 192/70.27 |

*Primary Examiner*—Rodney H. Bonck
*Attorney, Agent, or Firm*—Knobbe, Martens, Olson & Bear

[57] ABSTRACT

A clutch cover assembly comprising, in addition to a clutch cover containing a pressure plate and a diaphragm spring, a disc spring in location and retainment such that it provides cushioning against clutch engagement shock. The disc spring is installed in a receptacle on the pressure plate, adjacent the diaphragm spring, permitting its elastic deformation as it transmits the impelling force of the diaphragm spring in tandem therewith during clutch engagement. The thereby cushioned force of the diaphragm spring presses the pressure plate pressure surface against the friction facing of a clutch disc and sandwiches the clutch disc between the pressure plate and an engine flywheel.

8 Claims, 5 Drawing Sheets

CLUTCH COVER ASSEMBLY

BACKGROUND OF THE INVENTION

The present invention relates to a clutch cover assembly, and particularly to a clutch cover assembly comprising a pressure plate located within the clutch cover.

A clutch cover assembly employed in the clutch of an automobile generally comprises a dish-like clutch cover, a pressure plate located within the clutch cover, and a diaphragm spring impelling the pressure plate against a clutch disc. When the pressure plate is pressed toward the clutch disc, the clutch disc is sandwiched between the pressure plate and an engine flywheel, thereby engaging the clutch.

Some conventional clutch discs are composed of a plurality of stepped or corrugated cushioning plates fastened to the lateral faces of a clutch plate, and a pair of friction material facing rings bonded to the cushioning plates. Cushioning as the clutch is engaged is provided by such cushioning plates, alleviating the shock of clutch engagement.

However, it can be difficult to achieve cushioning of desired characteristics using the aforementioned cushioning plates, since through manufacture the cushioning response of each cushioning plate will vary. Furthermore, high temperatures developed in the clutch disc degrade the cushioning plates, reducing the degree of cushioning. It consequently is impracticable to maintain original cushioning characteristics.

SUMMARY OF THE INVENTION

It is an object of the present invention to facilitate the realization of desired and lasting cushioning characteristics.

A clutch cover assembly according to an aspect of the present invention sandwiches a clutch disc between itself and a input rotation member. The clutch cover assembly comprises a dish-like clutch cover, a pressure plate, a diaphragm spring and an elastic member. The pressure plate is located within the clutch cover and includes a pressure surface which presses the clutch disc against the input rotation member. The diaphragm spring is supported by the clutch cover and impels the pressure plate against the input rotation member. The elastic member is located between the pressure plate and the diaphragm spring, and transmits the impelling force of the diaphragm spring to the pressure plate.

In this clutch cover assembly, the diaphragm spring presses the pressure plate toward the clutch disc through the elastic member. After the clutch disc is just sandwiched between the pressure plate and the input rotation member, the elastic member begins to deflect, being further impelled by the diaphragm spring. Thereupon, cushioning is effected according to the load-deformation characteristics of the elastic member.

Wherein a spring such as a disc spring is employed as the elastic member, disposed between the diaphragm spring and the pressure plate, desired cushioning characteristics are readily obtained.

Moreover, the elastic member is situated ulterior to the pressure surface of the pressure plate, such that it is much less susceptible to the effects of high temperatures in the clutch disc, maintaining longevity of the cushioning characteristics.

The foregoing and other objects, aspects and advantages of the present invention will become more apparent from the following detailed description, taken in conjunction with the accompanying drawings.

DESCRIPTION OF THE PREFERRED EMBODIMENTS

Figure 1:
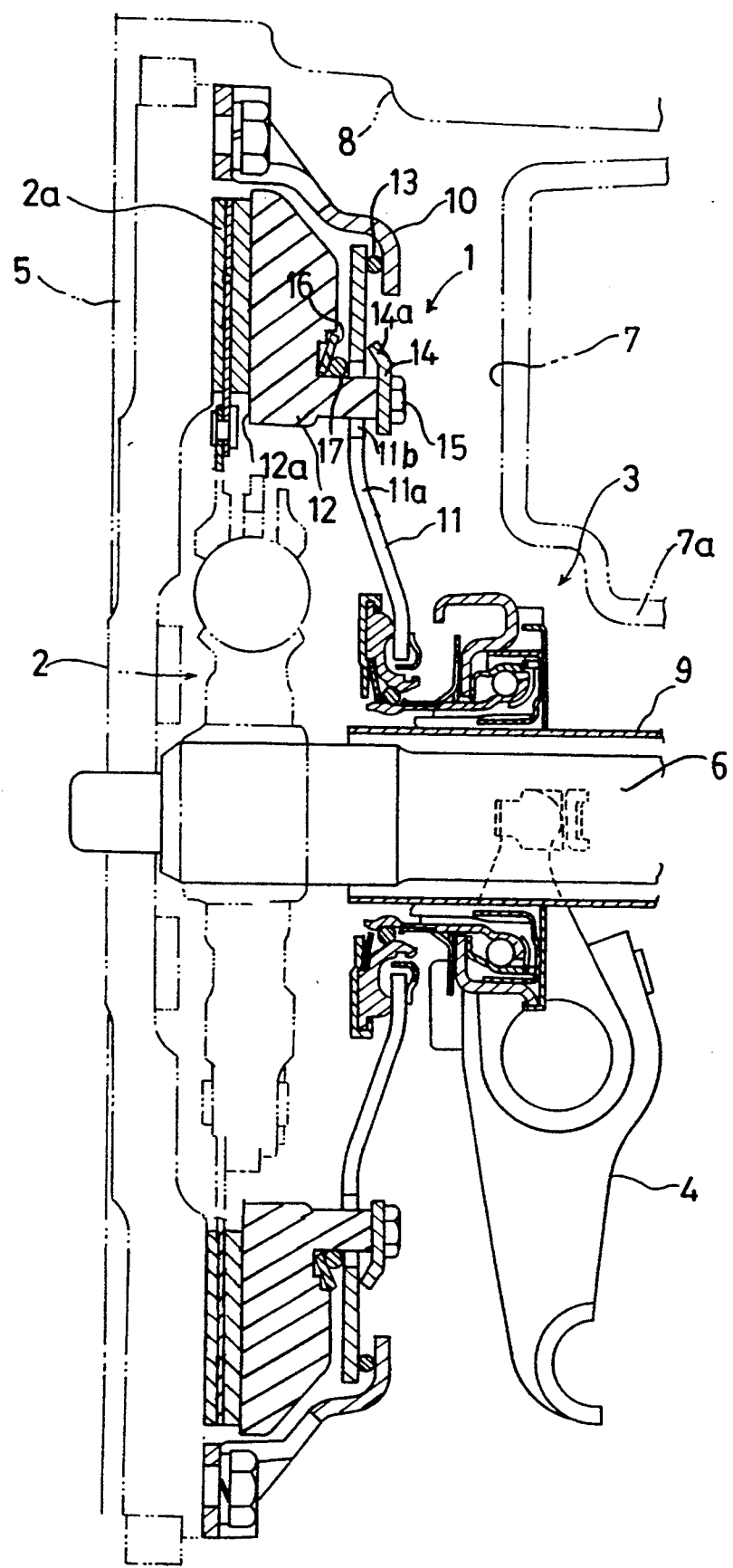
FIG. 1 is a cross sectional view showing a pull-type clutch to which an embodiment of the present invention is applied.

FIG. 1 shows a pull-type clutch to which an embodiment of the present invention is applied.

The pull-type clutch consists chiefly of a clutch cover assembly 1, a clutch disc assembly 2 and a release assembly 3. A release fork 4 is connected to the release assembly 3 in order to actuate the release assembly 3 in the axial direction. The clutch cover assembly 1 is mounted on an engine flywheel 5.

Rearward (rightward in FIG. 1) of the clutch cover assembly 1 is a transmission housing 7, from which a main drive shaft 6 extends forward into splined engagement with the clutch disc assembly 2. A clutch housing 8 is provided on the forward end of the transmission housing 7, enclosing the clutch cover assembly 1 and the flywheel 5. Centrally provided through a front end wall 7a of the transmission housing 7 is a collar 9 through which the main drive shaft 6 penetrates.

A pair of friction material facings 2a are peripherally provided along both lateral surfaces of the clutch disc assembly 2 and become sandwiched between the flywheel 5 and the pressure surface 12a of a pressure plate 12 (as described later). The friction facings 2a are bonded to planar surfaces of a disc instead of to the conventional cushioning plates. The tip of the main drive shaft 6 is in splined engagement with the central portion of the clutch disc 2.

Figure 2:
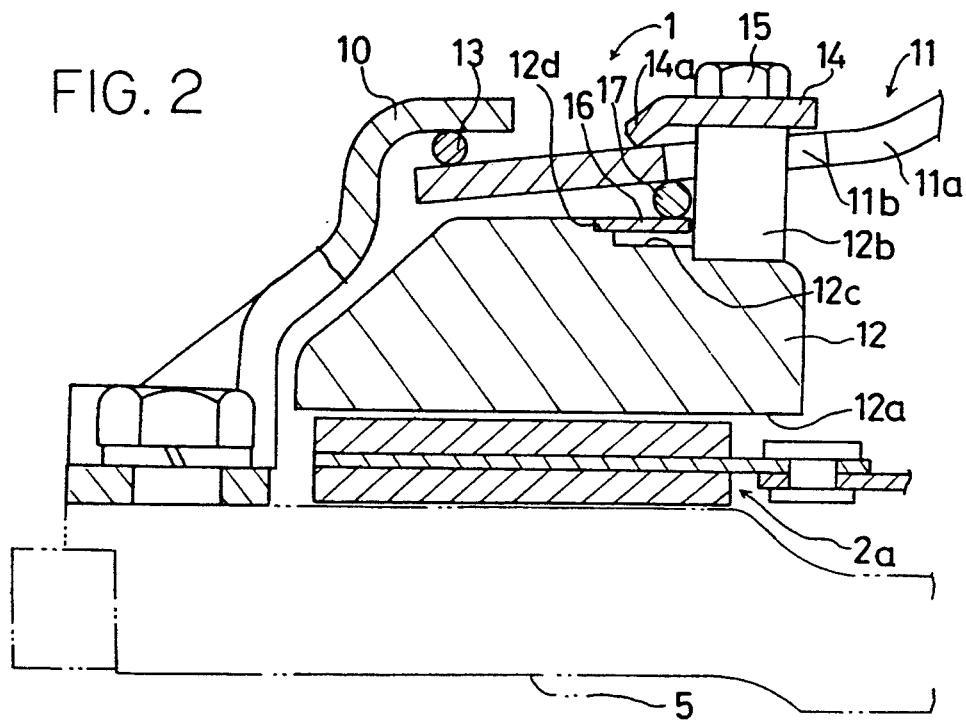
FIG. 2 is a partial enlarged view of FIG. 1.

FIG. 2 shows a part of the clutch cover assembly 1 as an embodiment of the present invention. A clutch cover 10, a diaphragm spring 11, and an annular pressure plate 12, major components of the clutch cover assembly 1, are depicted partially in FIG. 2.

The clutch cover 10 is formed like a dish with a large-diameter central opening, wherein the rim of the dish is fastened to the flywheel 5.

The diaphragm spring 11 is a disc member aligned with the clutch cover 10. The radially outward margin of the diaphragm spring 11 is supported by the clutch cover 10 on a first pivot ring 13. The diaphragm spring 11 impels the pressure plate 12 toward the flywheel 5 by the elasticity of its radially middle portion, wherein the first pivot ring 13 acts as a fulcrum. The radially inward portion of the diaphragm spring 11 is connected to the release assembly 3, such that extraction of the radially inward portion transmission-ward (rightward in FIG. 1) releases engagement of the clutch disc 2. A plurality of radial slits 11a is formed in the diaphragm spring 11 from the radially inward edge to the radially middle portion. A circular hole 11b is formed toward the end of each slit 11a.

The pressure plate 12 sandwiches the friction facings 2a of the clutch disc 2 between itself and the flywheel 5 in order to engage the clutch. As shown in FIG. 2, a facing of the pressure plate 12 constitutes a pressure surface 12a opposite an adjacent friction facing 2a. Radially inward along the opposite side of the pressure surface 12a are a plurality of dowels 12b extending laterally toward the transmission. Each hole 11b of the diaphragm spring 11 is penetrated by a dowel 12b. An annular retaining plate 14 is fixed to the dowels 12b by bolts 15. The retaining plate 14 has a bent portion 14a inclined toward the pressure plate 12 along its radially outward edge.

The face of the pressure plate 12 opposite the pressure surface 12a is grooved by an annular inner recess 12c. The inner recess 12c is formed surrounding the dowels 12b. An annular outer recess 12d which is shallower than the inner recess 12c is formed at the rim of the inner recess 12c. A disc spring 16 is provided between this radially inward portion of the pressure plate 12, and the diaphragm spring 11. The disc spring 16 is flat and annular, and its outer edge is supported in the outer recess 12d. The inner margin of the disc spring 16 is thus spaced apart from the inner recess 12c at a given spacing. A second pivot ring 17 is provided between the inner edge of the disc spring 16 and the diaphragm spring 11.

Impelling pressure from the diaphragm spring 11 is thus transmitted to the pressure plate 12 through the second pivot ring 17 and the disc spring 16.

Figure 3:
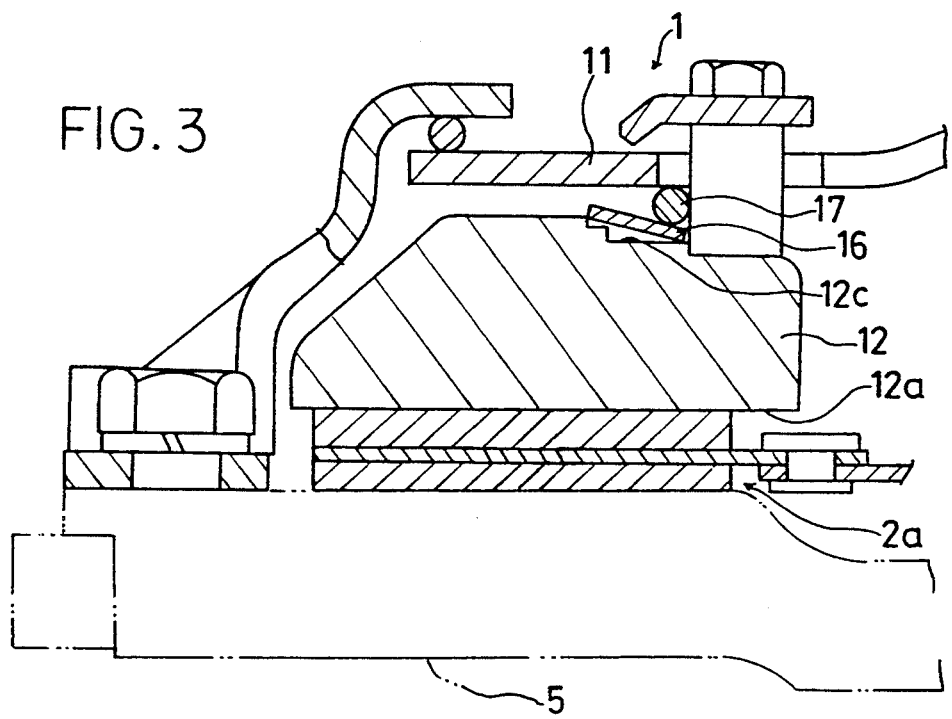
FIG. 3 is a view to illustrate engagement vs. disengagement of the clutch, corresponding to FIG. 2.

Now, operation of the clutch cover assembly 1 will be explained.

Wherein the release fork 4 is not pulling the release assembly 3 toward the transmission, the release assembly 3 is actuated towards the engine and the elasticity of the diaphragm spring 11 impels the pressure plate 12 toward the flywheel 5, wherein the radially outer edge of the diaphragm spring 11 is supported by the clutch cover 10 as a fulcrum, and its radially middle portion impels the pressure plate 12 toward the flywheel 5 through the second pivot ring 17 and the disc spring 16. Consequently, the pressure plate 12 presses the facings 2a into contact against the flywheel 5. Initially, then, the facings 2a are just sandwiched between the pressure plate 12 and the flywheel 5, thereby riding the clutch. As the diaphragm spring 11 continues to urge, the inner edge of the disc spring 16 elastically deforms toward the flywheel 5. During this deformation stage, cushioning is effected according to the load-deflection characteristics of the disc spring 16. This cushioning continues until the inner edge of the disc spring 16 comes into contact with the inner recess 12c of the pressure plate 12 (FIG. 3).

In this embodiment, given cushioning effects comparable to those produced by the conventional cushioning plates may be obtained. The disc spring 16 is of flat, simple form, providing desired cushioning characteristics more readily than through the conventional cushioning plates. Furthermore, the disc spring 16 is located ulterior to the friction facings 2a, where high temperatures are generated, promoting longevity of desirable cushioning characteristics.

Given that this clutch cover assembly 1 is employed in a pull-type clutch, the cushioning plates are thus omitted in the clutch disc assembly 2, such that the friction material facings 2a can be of increased thickness. This provides the clutch disc 2 with increased wear allowance.

When the release fork 4 extracts the release assembly 3 transmission-ward, the radially middle portion of the diaphragm spring 11 is thus drawn transmission-ward, wherein the first pivot ring 13 located in the clutch cover 10 acts as a fulcrum. The disc spring 16 returns to its initial set position as shown in FIG. 2, and the radially middle portion of the diaphragm spring 11 comes into abutment against the bent portion 14a of the retention plate 14. Thereupon, the diaphragm spring 11 draws the pressure plate 12 apart from the friction facings 2a through the retention plate 14, thereby releasing engagement of the clutch disc 2.

Figure 4:
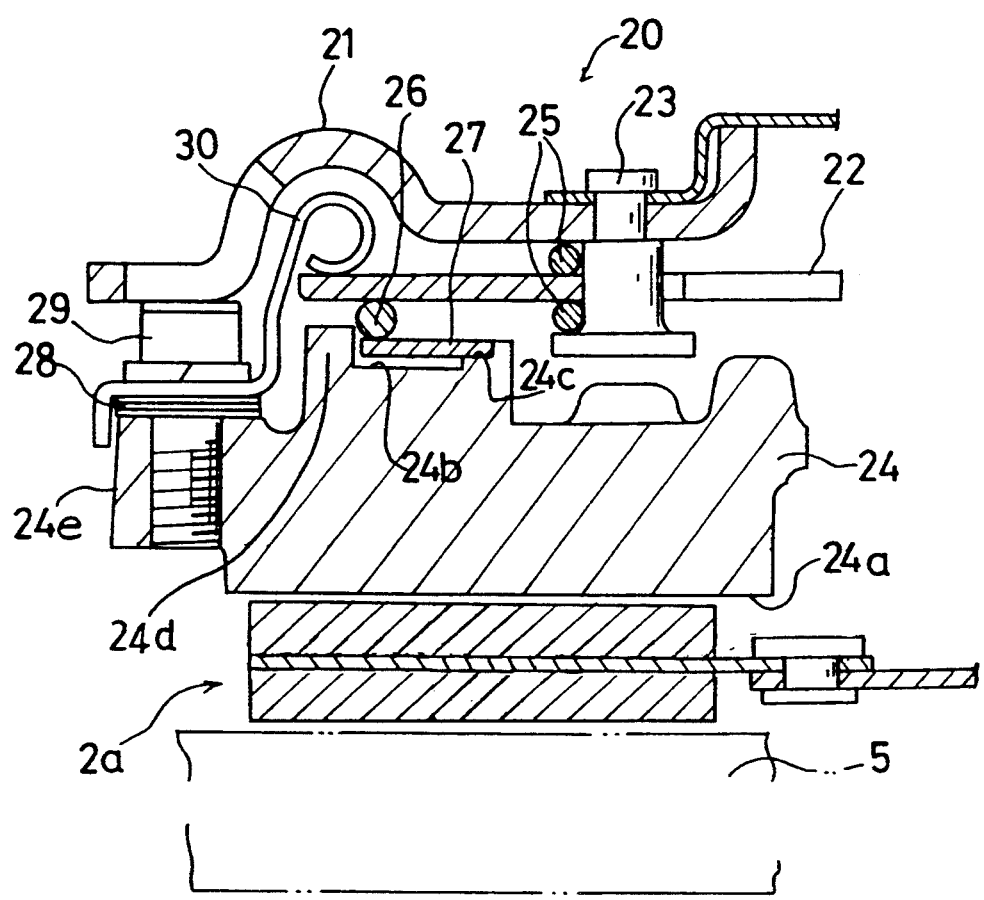
FIG. 4 is a view of another embodiment, corresponding to FIG. 2.

OTHER EMBODIMENTS (a) FIG. 4 shows detail of a clutch cover assembly 20 according to another embodiment of the present invention. This clutch cover assembly 20 is employed in a push-type clutch.

The clutch cover assembly 20 is chiefly composed of a dish-like clutch cover 21, the outer margin or which is fixed to the flywheel 5, a diaphragm spring 22 disposed within the clutch cover 21, and an annular pressure plate 24.

The diaphragm spring 22 is in alignment with the clutch cover 21, its radially middle portion being supported by the clutch cover 21 through stud pins 23 and a pair of first pivot rings 25 which function as a fulcrum. One end of the stud pins 23 is caulked to the clutch cover 21. The radially inward portion of the diaphragm spring 22 is retained by a release assembly (not shown) such that when the release assembly pushes the radially inward portion of the diaphragm spring 22 toward the flywheel 5 (downward in FIG. 4), clutch engagement is released.

The pressure plate 24 has a pressure surface 24a, ulterior to which is annular outer recess 24b. An annular inner recess 24c shallower than the outer recess 24b is formed along the radially inward rim of the outer recess 24b. Therein, a disc spring 27 is disposed between the pressure plate 24 and the diaphragm spring 22. The disc spring 27 is flat and annular, and its inner edge is supported on the inner recess 24c. A given spacing is provided between the outer edge of the disc spring 27 and the outer recess 24b. A second pivot ring 26 abuts against the outer edge of the disc spring 27 adjacent the diaphragm spring 22. The radially outward margin of the diaphragm spring 22 presses the second pivot ring 26 in impelling the pressure plate 24 toward the clutch disc 2. The outer rim of the recess 24b of the pressure plate 24 serves as an annular extension 24d to retain the second pivot ring 26.

Strap plates 28, composed of a plurality of leaf springs, are disposed in locations along the perimeter of the clutch cover assembly 20. One end of each strap plate 28 is fixed to the clutch cover 21, and the other end is fixed to the pressure plate 2 by bolts 29. Each bolt 29 is screwed into a tapped socket of a boss 24e provided along the outer periphery of the pressure plate 2. Each bolt 29 fastens the base of a clip 30, which extends from the bolt 29 toward the diaphragm spring 22, elastically urging it toward the second pivot ring 26. Thereby, the radially outward edge of the diaphragm spring 22 is sandwiched between the second pivot ring 26 and the clips 30.

In the aforementioned structure, desired cushioning effects are obtained, according to the characteristics of the disc spring 27, when the pressure plate 24 is pressed against the friction facing 2a; thus the is function the same, and the cushioning effects are likewise as in the aforementioned embodiment.

Figure 5:
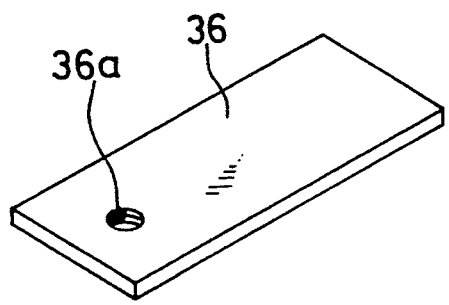
FIG. 5 is a perspective view showing a leaf spring of another embodiment.
Figure 6:
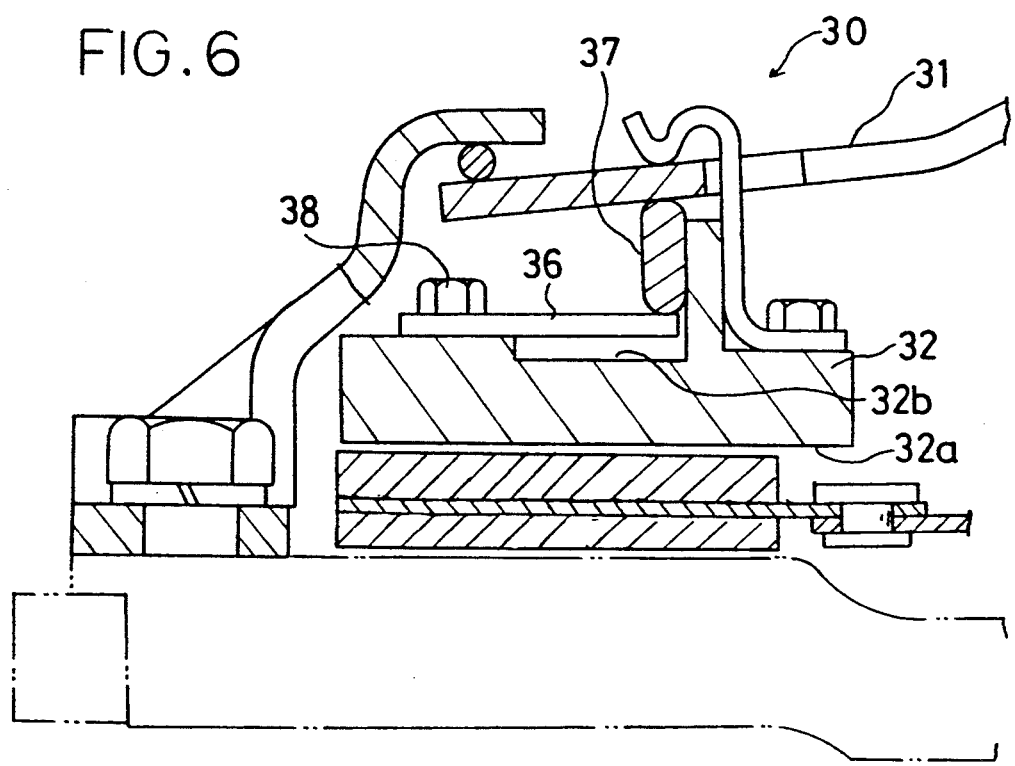
FIG. 6 is a view of still another embodiment, corresponding to FIG. 2.

(b) A plurality of leaf springs may be employed in lieu of the annular disc spring. Referring to FIG. 5, a leaf spring 36 therein is a rectangular flat plate having a bolt hole 36a at one end. FIG. 6 shows a pull-type clutch cover assembly 30. In this clutch cover assembly, the pressure plate 32 has an annular recess 32b ulterior to its pressure surface 32a. The leaf springs 36 are disposed radially at given circumferential spacings. Around the recess 32b, each leaf spring 36 is fastened at its radially outward end by a bolt 38. A given spacing is provided between the radially inward margin or each leaf spring 36 and the recess 32b. An annular fulcrum ring 37, elliptical in cross section, is disposed between the leaf springs 36 and the radially middle portion of the diaphragm spring 31. Impelling force from the diaphragm spring 31 is transmitted to the pressure plate 32 through the fulcrum ring 37 and the radially inward ends of the leaf springs 36.

Figure 7:
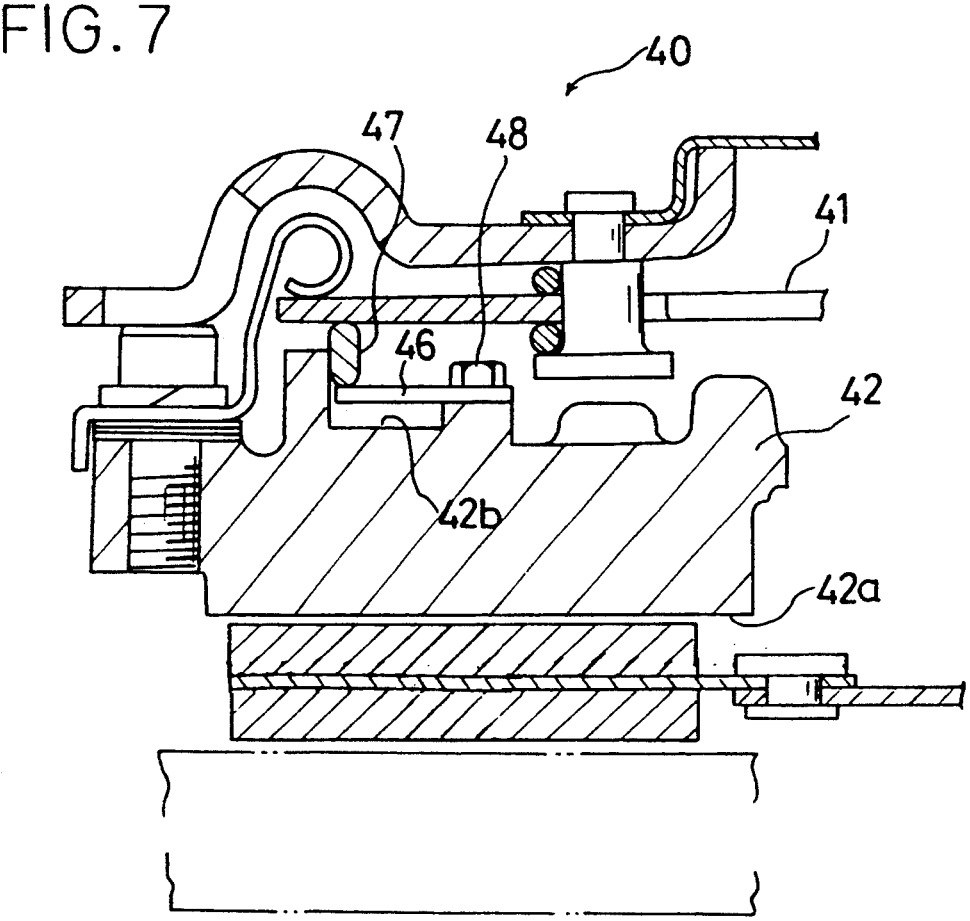
FIG. 7 is a view of a further embodiment, corresponding to FIG. 2.

FIG. 7 shows a corresponding clutch cover assembly 40 employed in a push-type clutch. A pressure plate 42 is grooved by an annular recess 42b ulterior to its pressure surface 42a. The radially inward ends of leaf springs 46 are fastened to the pressure plate 42 by bolts 48, and a given spacing is provided between their radially outward margins and the recess 42b. An annular fulcrum ring 47, elliptical in cross section, is disposed between the radially outward ends of the leaf springs 46 and the radially outward margin of the diaphragm spring 41. Impelling force from the diaphragm spring 41 is transmitted to the pressure plate 42 through the fulcrum ring 47 and the leaf springs 46.

With this structure, the function is the same, and cushioning effects are likewise as in the aforementioned embodiments.

Figure 8:
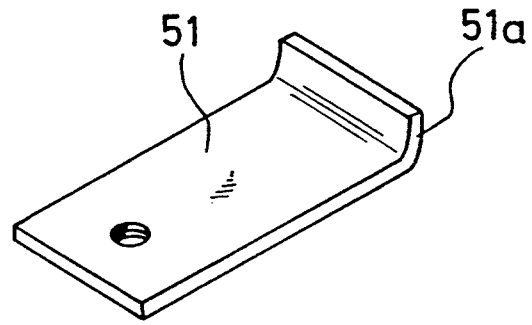
FIG. 8 is a view corresponding to FIG. 5, taken from a further embodiment.

(c) As shown in FIG. 8, leaf springs 51 having angled portions 51a at one end may be employed in place of flat leaf springs. In this case, the angled portions 51a are set to contact with the radially outward margin of the diaphragm spring 41, such that the fulcrum ring can be omitted.

Various details of the invention may be changed without departing from its spirit nor scope. Furthermore, the foregoing description of the embodiments according to the present invention is provided for the purpose of illustration only, and not for the purpose of limiting the invention as defined by the appended claims and their equivalents.

What is claimed is:

1. A clutch cover assembly, comprising:
   an input rotation member connected to an engine of an automobile;
   a clutch disc to be pressed against said input rotation member;
   a dish-shaped clutch cover fixed to said input rotation member;
   an annular one piece pressure plate disposed within said clutch cover, for pressing said clutch disc against said input rotation member, said pressure plate being connected to said input rotation member to rotate integrally and having a retainer on a side opposite to said rotation member;
   a diaphragm spring supported by said clutch cover, for impelling said pressure plate toward said input rotation member;
   a disc spring located between said pressure plate and said diaphragm spring for transmitting impelling force from said diaphragm spring to said pressure plate, said disc spring having a retained margin which is secured in said retainer on said pressure plate such that said disc spring is movable toward said rotation member, a free margin of said disc spring providing a given spacing from said pressure plate when said clutch disc is not pressed against said input rotation member, said retained margin of said disc spring being radially outward, and said free margin thereof being radially inward and a radially outward margin of said diaphragm spring being supported by said clutch cover, and a radially middle portion of said diaphragm spring pressing said radially inward margin of said disc spring through a wire ring; and
   said wire ring arranged between said disc spring and said diaphragm spring, said wire ring being located between said free margin of said disc spring and said diaphragm spring and being separated from said clutch cover and said pressure plate.

2. A clutch cover assembly according to claim 1, wherein:
   said diaphragm spring has a plurality of circumferentially disposed holes through its radially middle portion;
   said pressure plate, on a surface adjacent said diaphragm spring, is provided with a plurality of dowels extending through said plurality of holes; and
   said clutch cover assembly further comprising a retention member attached to said plurality of dowels, for supporting a surface of said diaphragm spring ulterior to said pressure plate.

3. A clutch cover assembly according to claim 2, wherein said plurality of pressure plate dowels are disposed radially inward of said wire ring.

4. A clutch cover assembly according to claim 3, wherein said retention member is an annular plate having a bent portion along its radially outward margin inclined toward said pressure plate.

5. A clutch assembly, comprising:
   an input rotation member connected to an engine of an automobile;
   a clutch disc to be pressed against said input rotation member;
   a dish-shaped clutch cover fixed to said input rotation member;
   an annular one piece pressure plate disposed within said clutch cover, for pressing said clutch disc against said input rotation member, said pressure plate being connected to said input rotation member to rotate integrally and having a retainer on a side opposite to said rotation member, said pressure plate including a laterally protruding rim for radial retention of said wire ring;
   a diaphragm spring supported by said clutch cover, for impelling said pressure plate toward said input rotation member, a radially middle portion of said diaphragm spring being supported by said clutch cover, and a radially outer portion of said diaphragm spring pressing said radially outward margin of said disc spring through said wire ring;
   a disc spring located between said pressure plate and said diaphragm spring for transmitting impelling force from said diaphragm spring to said pressure plate, said disc spring having a retained margin which is secured in said retainer on said pressure plate such that said disc spring is movable toward said rotation member, a free margin of said disc spring providing a given spacing from said pressure plate when said clutch disc is not pressed against said input rotation member, said retained margin of said disc spring being radially inward and said free margin thereof being radially outward; and a wire ring arranged between said disc spring and said diaphragm spring, said wire ring being located between said free margin of said disc spring and said diaphragm spring and being separated from said clutch cover and said pressure plate.

6. A clutch cover assembly according to claim 5, further comprising a plurality of pressing elements fixed to the radially outer periphery of said pressure plate and elastically pressing on a surface of said diaphragm spring ulterior to said wire ring.

7. A clutch cover assembly, comprising:
an input rotation member connected to an engine of an automobile;
a clutch disc to be pressed against said input rotation member;
a dish-shaped clutch cover;
a pressure plate disposed within said clutch cover, for pressing said clutch disc against said input rotation member;
a diaphragm spring supported by said clutch cover, for impelling said pressure plate toward said input rotation member;
an elastic member located between said pressure plate and said diaphragm spring for transmitting impelling force from said diaphragm spring to said pressure plate, said elastic member being composed of a plurality of leaf springs, an unfixed end of each of said leaf springs being so disposed as to provide a given spacing from said pressure plate wherein said clutch disc is not pressed against said input rotation member;

a fixing element for fixing one end of each of said leaf springs to said pressure plate;
a ring element located between said unfixed ends of said leaf springs and said diaphragm spring;
wherein said fixed ends of said leaf springs are radially inward and said unfixed ends thereof are radially outward; a radially middle portion of said diaphragm spring is supported by said clutch cover, and a radially outer portion of said diaphragm spring presses said radially outward ends of said leaf springs through said ring element.

8. A clutch cover assembly, comprising:
an input rotation member connected to an engine of an automobile;
a clutch disc to be pressed against said input rotation member;
a dish-shaped clutch cover;
a pressure plate disposed within said clutch cover, for pressing said clutch disc against said input rotation member;
a diaphragm spring supported by said clutch cover, for impelling said pressure plate toward said input rotation member;
an elastic member located between said pressure plate and said diaphragm spring for transmitting impelling force from said diaphragm spring to said pressure plate, said elastic member being composed of a plurality of leaf springs, an unfixed end of each of said leaf springs being so disposed as to provide a given spacing from said pressure plate wherein said clutch disc is not pressed against said input rotation member, said unfixed ends having angled portions in contact with said diaphragm spring;
a fixing element for fixing one end of each of said leaf springs to said pressure plate;
wherein said leaf springs are disposed radially at given circumferential spacings, said fixed ends of said leaf springs are radially inward and said unfixed ends thereof are radially outward; and a radially middle portion of said diaphragm spring is supported by said clutch cover, and radially outer portion of said diaphragm spring presses against said angled portions of said leaf springs.

* * * * *